US012668249B2

(12) United States Patent
Takahashi et al.

(10) Patent No.: US 12,668,249 B2
(45) Date of Patent: Jun. 30, 2026

(54) ABNORMALITY DETECTION DEVICE, ABNORMALITY DETECTION METHOD, AND ABNORMALITY DETECTION PROGRAM

(71) Applicant: YAZAKI CORPORATION, Tokyo (JP)

(72) Inventors: Yuki Takahashi, Susono (JP); Yoshihiro Takahashi, Susono (JP); Jungang Guan, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 30 days.

(21) Appl. No.: 18/908,748

(22) Filed: Oct. 7, 2024

(65) Prior Publication Data

US 2025/0128716 A1 Apr. 24, 2025

(30) Foreign Application Priority Data

Oct. 19, 2023 (JP) ................................. 2023-180045

(51) Int. Cl.
| | |
|---|---|
| *B60W 40/08* | (2012.01) |
| *G06V 20/59* | (2022.01) |
| *G06V 40/10* | (2022.01) |
| *G06V 40/20* | (2022.01) |

(52) U.S. Cl.
CPC ........... *B60W 40/08* (2013.01); *G06V 20/597* (2022.01); *G06V 40/10* (2022.01); *G06V 40/20* (2022.01); *B60W 2420/403* (2013.01); *B60W 2540/221* (2020.02)

(58) Field of Classification Search
CPC ................. G06V 20/597; G06V 40/20; B60W 2040/0818; B60W 2540/225; B60W 2540/22; B60K 28/06; B60T 7/14
See application file for complete search history.

(56) References Cited

U.S. PATENT DOCUMENTS

| | | | |
|---|---|---|---|
| 2014/0121927 A1* | 5/2014 | Hanita ...................... | B60T 7/12 701/70 |
| 2021/0107493 A1 | 4/2021 | Iwashita | |
| 2022/0144307 A1* | 5/2022 | Jung ................. | B60W 60/0055 |

(Continued)

FOREIGN PATENT DOCUMENTS

| | | |
|---|---|---|
| JP | 2021-061903 A | 4/2021 |
| WO | 2013/008300 A1 | 1/2013 |

*Primary Examiner* — Mirza F Alam
(74) *Attorney, Agent, or Firm* — KENEALY VAIDYA LLP

(57) ABSTRACT

An abnormality detection device includes a motion detection unit that detects a motion indicating pain associated with a disease of a body of a driver based on motion information of the driver acquired by a camera, a behavior detection unit that detects abnormal behavior of a vehicle based on behavior information acquired by a vehicle behavior information acquisition unit, a biometric information detection unit that detects biometric information that is an abnormal sign of the driver based on biometric information acquired by the biometric information acquisition unit, and an abnormal sign determination unit that determines whether the driver shows an abnormal sign in the body by using all or some of a detection result of the motion detection unit, a detection result of the behavior detection unit, and a detection result of the biometric information detection unit.

7 Claims, 3 Drawing Sheets

(56) References Cited

U.S. PATENT DOCUMENTS

| | | | |
|---|---|---|---|
| 2023/0339476 A1* | 10/2023 | Oba | B60W 50/14 |
| 2024/0051585 A1* | 2/2024 | Oba | B60W 60/0053 |
| 2024/0208482 A1* | 6/2024 | Takahashi | B60N 2/0268 |

* cited by examiner

FIG.2

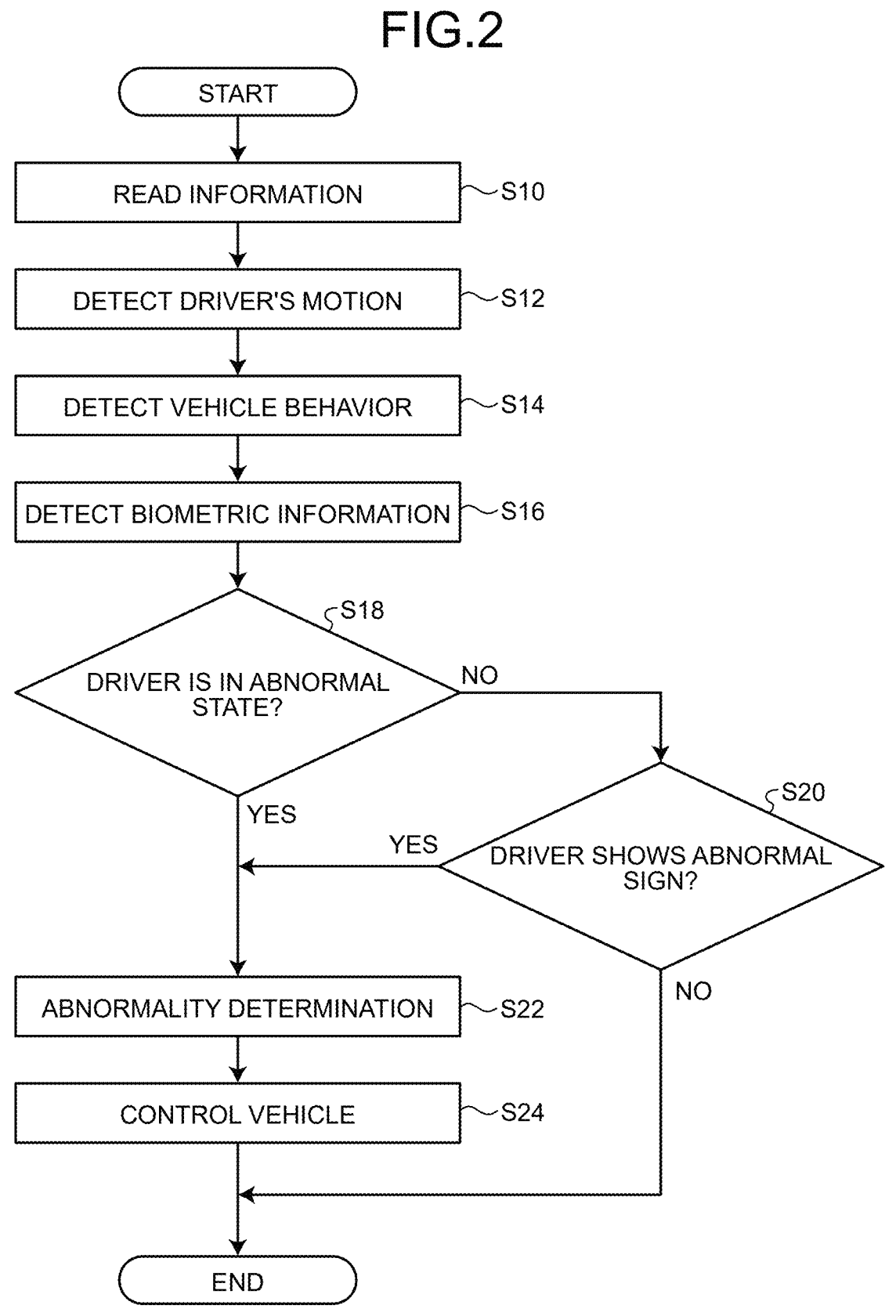

```
        ┌─────────────┐
        │    START    │
        └─────────────┘
               │
               ▼
  ┌───────────────────────────┐
  │     READ INFORMATION      │─── S10
  └───────────────────────────┘
               │
               ▼
  ┌───────────────────────────┐
  │   DETECT DRIVER'S MOTION  │─── S12
  └───────────────────────────┘
               │
               ▼
  ┌───────────────────────────┐
  │  DETECT VEHICLE BEHAVIOR  │─── S14
  └───────────────────────────┘
               │
               ▼
  ┌───────────────────────────┐
  │ DETECT BIOMETRIC INFORMATION │─── S16
  └───────────────────────────┘
               │
               ▼
                                        S18
              ╱╲
            ╱    ╲
          ╱        ╲
        ╱  DRIVER IS  ╲      NO
       ⟨  IN ABNORMAL   ⟩ ──────────────┐
        ╲   STATE?    ╱                  │
          ╲        ╱                     ▼
            ╲    ╱                                        S20
              ╲╱                        ╱╲
               │ YES                  ╱    ╲
               │           YES      ╱        ╲
               │◄──────────────────⟨  DRIVER SHOWS ⟩
               │                     ╲  ABNORMAL   ╱
               │                       ╲  SIGN?  ╱
               ▼                         ╲    ╱
  ┌───────────────────────────┐           ╲╱
  │ ABNORMALITY DETERMINATION │─── S22      │ NO
  └───────────────────────────┘            │
               │                           │
               ▼                           │
  ┌───────────────────────────┐            │
  │      CONTROL VEHICLE      │─── S24      │
  └───────────────────────────┘            │
               │                           │
               │◄──────────────────────────┘
               ▼
        ┌─────────────┐
        │     END     │
        └─────────────┘
```

FIG.3

| | ABNORMAL SIGN | | ABNORMAL STATE |
|---|---|---|---|
| MECHANISM OF DISEASE | PLAQUES (LIPIDS) ARE GENERATED IN CORONARY ARTERY AND CORONARY ARTERY NARROWS | → NARROWING OF CORONARY ARTERIES REDUCES BLOOD FLOW | → SUPPLY OF BLOOD (OXYGEN) TO HEART BECOMES INSUFFICIENT AND MOVEMENTS SLOW DOWN |
| SYMPTOM | HARD TO BREATHE DISCOMFORT IN CHEST AND SHOULDERS | → SQUEEZING PAIN (SHOULDERS, CHEST, AND NECK) PALPITATIONS, VERTIGO | → LOSS OF CONSCIOUSNESS, SYNCOPE |
| MOTION TO OCCUR CHANGE IN BIOMETRIC INFORMATION | FREQUENTLY TOUCH ON CHEST AND SHOULDERS INCREASE IN RESPIRATORY RATE | → HOLD CHEST, SHOULDERS, AND NECK HEART RATE AND BLOOD PRESSURE INCREASE DUE TO PAIN | → POSTURE INSTABILITY (SUPINE, PRONE, LATERAL FALL) |
| BEHAVIOR OF VEHICLE | OPERATION DELAY SPEED INCREASES (OR DECREASES) | → UNSTEADY TRAVELING, OPERATION DELAY COLLISION RISK CROSSING STOP LINE, AND THE LIKE | → DIFFICULTY IN DRIVING |

ABNORMALITY DETECTION DEVICE, ABNORMALITY DETECTION METHOD, AND ABNORMALITY DETECTION PROGRAM

CROSS-REFERENCE TO RELATED APPLICATION(S)

The present application claims priority to and incorporates by reference the entire contents of Japanese Patent Application No. 2023-180045 filed in Japan on Oct. 19, 2023.

BACKGROUND OF THE INVENTION

1. Field of the Invention

The present invention relates to an abnormality detection device, an abnormality detection method, and an abnormality detection program.

2. Description of the Related Art

Conventionally, as related to an abnormality detection device, an abnormality detection method, and an abnormality detection program, for example, a device that detects abnormality or deterioration in a body condition of a driver of a vehicle is known as described in International Publication 2013/8300. The device detects abnormality or deterioration in a body condition of a driver by detecting a posture, a face direction, or the like of the driver using a camera that captures an image of the driver.

The device described above has room for improvement in that the device has difficulty in early detecting abnormality of the driver with high accuracy. Although the device described above detects abnormality or deterioration of the driver, it is desirable to early detect abnormality of the driver from the viewpoint of safety of vehicle travel.

SUMMARY OF THE INVENTION

Therefore, an object of the present invention is to provide an abnormality detection device, an abnormality detection method, and an abnormality detection program capable of early detecting abnormality of a driver with high accuracy.

In order to achieve the above mentioned object, an abnormality detection device according to one aspect of the present invention includes an input unit that inputs motion information and biometric information on a driver of a vehicle, and behavior information on the vehicle; a detection unit that detects an abnormal sign of the driver based on the motion information, the biometric information, and the behavior information; and an abnormal sign determination unit that determines whether the driver shows an abnormal sign in a body based on a detection result of the detection unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a flowchart illustrating an operation of the abnormality detection device, an abnormality detection method, and an abnormality detection program according to the embodiment; and FIG. 3 is a diagram illustrating an example of an abnormal sign and an abnormal state of a driver.

DETAILED DESCRIPTION OF THE PREFERRED EMBODIMENTS

Figure 1:
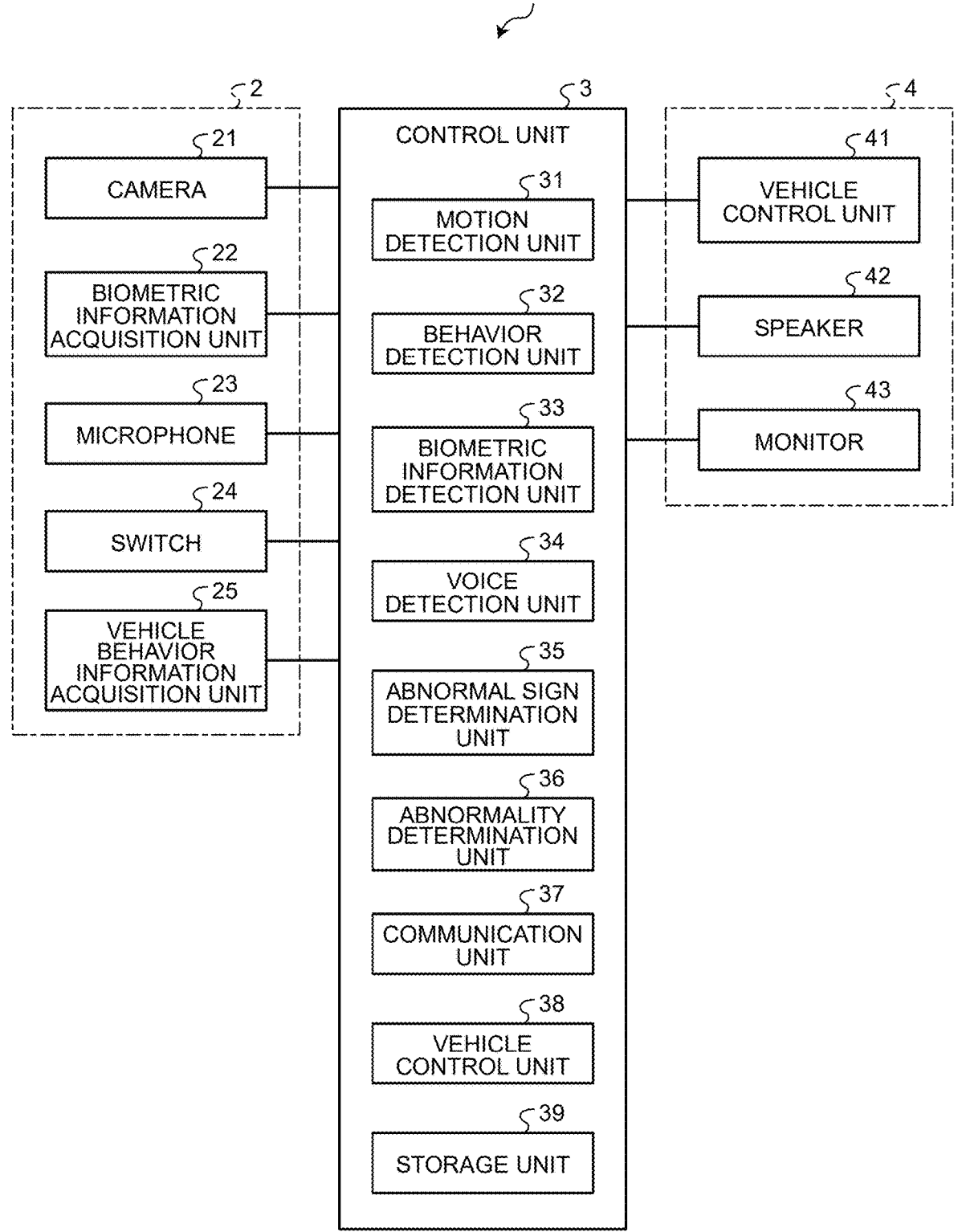
FIG. 1 is a block diagram illustrating an outline of an electrical configuration of an abnormality detection device according to an embodiment.

Hereinafter, an embodiment according to the present invention will be described in detail with reference to the drawings. Note that the present invention is not limited to the embodiment. In addition, constituent elements in the following embodiment include those that can be easily replaced by those skilled in the art or those that are substantially the same.

Embodiment

The present embodiment relates to an abnormality detection device, an abnormality detection method, and an abnormality detection program. As illustrated in FIG. 1, an abnormality detection device 1 is a device that detects a sign of abnormality of a driver of a vehicle and detects an abnormal state of the driver. Here, the abnormal state is a state in which the driver is unable to drive normally, and is, for example, a state in which the driver has difficulty in driving. The sign of abnormality is a state different from a normal state of the driver prior to the abnormal state.

The abnormality detection device 1 includes an input unit 2, a control unit 3, and an output unit 4. The input unit 2 inputs, to the control unit 3, information or data related to abnormality detection in the driver. For example, the input unit 2 inputs motion information and biometric information on the driver and behavior information of the vehicle. The input unit 2 includes, for example, a camera 21, a biometric information acquisition unit 22, a microphone 23, a switch 24, and a vehicle behavior information acquisition unit 25.

The camera 21 is an imaging unit that captures an image of the driver. The camera 21 is installed in the vehicle and inputs the captured image of the driver to the control unit 3. The camera 21 functions as a motion acquisition unit that acquires the motion information on the driver. The camera 21 is so provided that an image of the driver can be captured from the front in the vehicle, for example. Further, the camera 21 may include an imaging unit that captures an image of the upper body of the driver and an imaging unit that captures an image of the face of the driver separately.

The biometric information acquisition unit 22 acquires the biometric information on the driver. For example, a heart rate measurement instrument that measures a heart rate and a pulse rate, a sphygmomanometer that measures blood pressure, a thermometer that measures a body temperature, and the like correspond to the biometric information acquisition unit 22. As the heart rate measurement instrument, the sphygmomanometer, and the thermometer, for example, a wearable device that can be worn on the driver for measurement is used. Further, the heart rate measurement instrument may be, for example, a millimeter wave radar. In a case where the millimeter wave radar is used as the heart rate measurement instrument, the heart rate can be measured without making contact with the driver, and the respiratory rate can also be measured. The biometric information acquisition unit 22 can communicate with the control unit 3 in a wired or wireless manner, and inputs biometric information on the driver to the control unit 3.

The microphone 23 detects a driver's voice, generates and acquires voice information, and inputs the voice information to the control unit 3. Further, the microphone 23 acquires voice information on a response of the driver to a call from the abnormality detection device 1 or response information thereof. The switch 24 includes, for example, a push button, and acquires response information on the driver in response to a call from the abnormality detection device 1. The switch 24 inputs the response information to the control unit 3. Note that the input unit 2 may include a device, a sensor, or the like other than the camera 21, the biometric information acquisition unit 22, the microphone 23, the switch 24, and the vehicle behavior information acquisition unit 25 described above as long as such a device, a sensor, or the like can acquire information for detecting an abnormal state or an abnormal sign of the driver.

The vehicle behavior information acquisition unit 25 is a device that acquires behavior information on the vehicle. For example, a vehicle speed sensor, a steering angle sensor, a camera, and a millimeter wave radar correspond to the vehicle behavior information acquisition unit 25. The vehicle speed sensor detects a traveling speed of the vehicle. The steering angle sensor detects a steering wheel angle of the vehicle and provides information for determining whether the vehicle wobbles while traveling. The camera captures, for example, an image of the front of the vehicle, and provides information for determining whether the vehicle strays out of the lane, information for determining whether the vehicle crosses a stop line, and information on following distance from the preceding vehicle. The millimeter wave radar detects a distance to the preceding vehicle or an obstacle in front of the vehicle. The vehicle behavior information acquisition unit 25 may include all or some of the vehicle speed sensor, the steering angle sensor, the camera, and the millimeter wave radar, or may include a device, a sensor, or the like other than the vehicle speed sensor, the steering angle sensor, the camera, and the millimeter wave radar as long as information for detecting abnormal behavior of the vehicle can be acquired.

The output unit 4 is a device that operates based on a signal output from the control unit 3. For example, a vehicle control unit 41, a speaker 42, and a monitor 43 correspond to the output unit 4. The vehicle control unit 41 includes a control device that performs braking control, driving control, and steering control of the vehicle in response to a control signal output from the control unit 3. For example, the vehicle control unit 41 includes individual control devices that perform, for example, braking control, driving control, and steering control of the vehicle. The speaker 42 calls the driver by a voice based on a signal output from the control unit 3. The speaker 42 functions as a notification unit that gives a notification to the driver through hearing, and operates and outputs a voice in response to a voice signal from the control unit 3, for example. The monitor 43 functions as a notification unit that gives a notification to the driver through sight, is a liquid crystal display or the like, for example, and operates in response to a display signal from the control unit 3. In addition, the monitor 43 may be used not only as a display device but also as an input device by using a touch panel or the like.

The control unit 3 is a control unit that detects abnormality of the driver, and is configured with, for example, a computer. The control unit 3 includes a central processing unit (CPU), a read only memory (ROM), and a random access memory (RAM), and for example, loads the abnormality detection program stored in the ROM into the RAM and executes the program by the CPU to detect abnormality.

The control unit 3 includes a motion detection unit 31, a behavior detection unit 32, a biometric information detection unit 33, a voice detection unit 34, an abnormal sign determination unit 35, an abnormality determination unit 36, a vehicle control unit 38, a communication unit 37, and a storage unit 39. The motion detection unit 31, the behavior detection unit 32, the biometric information detection unit 33, the voice detection unit 34, the abnormal sign determination unit 35, the abnormality determination unit 36, and the vehicle control unit 38 are configured by, for example, introducing the abnormality detection program into the control unit 3. Further, the motion detection unit 31, the behavior detection unit 32, the biometric information detection unit 33, the voice detection unit 34, the abnormal sign determination unit 35, the abnormality determination unit 36, and the vehicle control unit 38 may be configured as individual control units. The motion detection unit 31, the behavior detection unit 32, the biometric information detection unit 33, and the voice detection unit 34 function as detection units that detect an abnormal sign of the driver based on, for example, the motion information and the biometric information on the driver and the behavior information on the vehicle.

The motion detection unit 31 serves to detect a motion of the driver. The motion detection unit 31 detects a motion of the driver using an image analysis method or an image recognition method based on image information output from the camera 21. As the image analysis method and the image recognition method, known image analysis methods and image recognition methods may be used. The motion detection unit 31 detects a posture, a motion, an expression, and the like of the driver. For example, the motion detection unit 31 detects a motion of the driver in an abnormal state and a motion that is an abnormal sign of the driver. The motion detection unit 31 also detects a motion related to a disease of the driver.

For example, posture instability in the driver, hands off steering wheel, syncope, closed eyes, eyes rolling back, or the like correspond to the motion of the driver in the abnormal state. The posture instability is a state in which the posture collapses compared to a normal driving posture, and for example, a state in which the driver leans back on the seat and cannot firmly hold the steering wheel, a state in which the driver crouches, and the like correspond to the posture instability is a state in which the posture collapses compared to a normal driving posture.

For example, a motion indicating pain when the driver feels pain in his/her body corresponds to the motion that is an abnormal sign of the driver. The motion indicating pain includes such a motion and expression that the driver feels pain. For example, a motion of holding the chest, a motion of holding the head, a motion of holding the back, a motion of holding a shoulder, a motion of holding the neck, and an expression of pain correspond to the motion indicating pain. The motion indicating pain of the driver is a motion of an abnormal sign before the driver experiences difficulty in driving. The motion detection unit 31 detects a motion indicating pain, which enables the abnormality detection device 1 to early detect that the driver is in an abnormal state. Further, the motion indicating pain includes the motion of holding the chest, the motion of holding the head, and the motion of holding the back. This enables the motion detection unit 31 to detect an abnormal sign of a heart disease, a brain disease, and an arterial disease (aortic aneurysm, aortic dissection). It is said that accidents caused by a heart disease, a brain disease, and an arterial disease account for 70% or more of accidents resulting from driver's diseases. Accordingly, detecting an abnormal sign of a heart disease, a brain disease, and an arterial disease makes it possible to accurately improve the safety of vehicle travel.

The behavior detection unit 32 detects behavior of the vehicle, and detects abnormal behavior of the vehicle based on the behavior information acquired by the vehicle behavior information acquisition unit 25. For example, the behavior detection unit 32 detects abnormal behavior of the vehicle due to an abnormal sign of the driver. Specifically, the behavior detection unit 32 detects, as the abnormal behavior of the vehicle, vehicle lane departure, unsteady traveling of the vehicle, operational delay of the vehicle, crossing a stop line, traveling with a risk of a forward collision, and the like. Therefore, the behavior detection unit 32 functions as a behavior detection unit of the vehicle.

The biometric information detection unit 33 detects biometric information on the driver, and detects biometric information that is an abnormal sign of the driver based on the biometric information on the driver acquired by the biometric information acquisition unit 22. For example, the biometric information detection unit 33 detects all or some of an increase in the pulse rate by a predetermined value or more, a decrease in the pulse rate by a predetermined value or less, an increase in the blood pressure by a predetermined value or more, a decrease in the blood pressure by a predetermined value or less, a pulse wave abnormality, arrhythmia, an increase in the respiratory rate by a predetermined number or more, and a decrease in the respiratory rate by a predetermined number or less.

The voice detection unit 34 detects the voice of the driver, and detects voice information that is an abnormal sign of the driver based on the voice information acquired by the microphone 23. For example, the voice detection unit 34 detects a voice related to a disease of the driver and detects a voice that is an abnormal sign of the driver. For example, the voice detection unit 34 detects a groan and a cry of the driver as the voice that is an abnormal sign of the driver. In this case, the voice detection unit 34 functions as a motion detection unit that detects a motion of the driver.

The abnormal sign determination unit 35 determines whether the driver shows an abnormal sign. For example, the abnormal sign determination unit 35 determines whether the driver shows an abnormal sign based on the detection results of the motion detection unit 31, the behavior detection unit 32, the biometric information detection unit 33, and the voice detection unit 34. Specifically, the abnormal sign determination unit 35 determines that the driver shows an abnormal sign in a case where all or some of the motion detection unit 31, the behavior detection unit 32, the biometric information detection unit 33, and the voice detection unit 34 detect that the driver shows an abnormal sign. The case where some of the motion detection unit 31, the behavior detection unit 32, the biometric information detection unit 33, and the voice detection unit 34 detect that the driver shows an abnormal sign is, for example, a case where at least two of the motion detection unit 31, the behavior detection unit 32, the biometric information detection unit 33, and the voice detection unit 34 detect that the driver shows an abnormal sign. Specifically, in a case where one or more of the motion detection unit 31 and the biometric information detection unit 33 detect that the driver shows an abnormal sign as well as in a case where the behavior detection unit 32 detects that the driver shows an abnormal sign, the abnormal sign determination unit 35 determines that the driver shows an abnormal sign. On the other hand, in a case where the motion detection unit 31 and the biometric information detection unit 33 each detect that the driver does not show any abnormal sign, or, alternatively, in a case where the behavior detection unit 32 detects that the driver does not show any abnormal sign, the abnormal sign determination unit 35 determines that the driver does not show any abnormal sign. As described above, according to the determination as to an abnormal sign, the detection of an abnormal sign of the driver by the behavior detection unit 32 is included in conditions for determining an abnormal sign. This can reduce an erroneous detection of an abnormal sign.

The abnormality determination unit 36 determines whether the driver is in an abnormal state. For example, in a case where the motion detection unit 31 detects a closed eyes state, a syncope state, an eyes rolling back state, or a posture instability state of the driver, the abnormality determination unit 36 determines that the driver has difficulty in driving and is in an abnormal state. In this case, the abnormality determination unit 36 determines that the driver has difficulty in driving and in an abnormal state in a case where the driver is in a closed eyes state, a syncope state, an eyes rolling back state, or a posture instability state continuously for a preset time. Further, even in a case where the driver is not in a closed eyes state, a syncope state, an eyes rolling back state, or a posture instability state, the abnormality determination unit 36 can determine that the driver is in an abnormal state when he/she has difficulty in driving.

In a case where the abnormal sign determination unit 35 determines that the driver shows an abnormal sign, the abnormality determination unit 36 determines that the driver is in an abnormal state. The abnormality determination unit 36 determines that the driver is in an abnormal state when the driver shows an abnormal sign, so that the abnormality of the driver can be detect early, and the vehicle control can be executed early to ensure the safety of vehicle travel.

In a case where the abnormal sign determination unit 35 determines that the driver shows an abnormal sign, the abnormality determination unit 36 may activate the speaker 42 to call the driver to check for any abnormality. Then, the abnormality determination unit 36 may determine that the driver is in an abnormal state when there is no response from the driver.

In a case where the abnormality determination unit 36 determines that the driver is in an abnormal state, the vehicle control unit 38 outputs a control signal to the vehicle control unit 41 to achieve the safety of vehicle travel. For example, the vehicle control unit 38 outputs a control signal to the vehicle control unit 41 to slow down and stop the vehicle. Further, the vehicle control unit 38 may output a control signal to the vehicle control unit 41 to cause the vehicle to automatically run to a position where the vehicle can safely stop, and stop the vehicle after the stop position is determined.

The communication unit 37 is a part that performs wireless communication with outside of the control unit 3. For example, the communication unit 37 performs wireless communication with the biometric information acquisition unit 22 to acquire biometric information on the driver.

The storage unit 39 stores information, data, or the like regarding abnormality detection. For example, the storage unit 39 stores the abnormality detection program, control data, and the like.

Next, an operation of the abnormality detection device 1, an abnormality detection method, and the abnormality detection program according to the present embodiment will be described.

FIG. 2 is a flowchart illustrating an operation of the abnormality detection device 1, an abnormality detection method, and the abnormality detection program. A series of control processing in the flowchart of FIG. 2 is started, for example, in response to the ignition of the vehicle turned on or the power source turned on, and is repeatedly executed at a predetermined cycle by the control unit 3.

First, as illustrated in Step S10 in FIG. 2 (hereinafter, simply referred to as "S10", the same applies to processes after S10), a process of reading information regarding abnormality detection is performed. As the information regarding abnormality detection, for example, information output from the camera 21, the biometric information acquisition unit 22, and the microphone 23 is input to the control unit 3 and read.

Then, the process proceeds to S12 in which a driver's motion detection process is performed. The motion detection process is a process to detect a motion of the driver. The motion detection process is performed by the motion detection unit 31 using, for example, an image analysis method or an image recognition method based on the image information output from the camera 21. The motion detection unit 31 detects a motion related to a disease of the driver, and detects a motion of the driver in an abnormal state and a motion that is an abnormal sign of the driver. The motion detection unit 31 detects, as the motion of the driver in the abnormal state, posture instability in the driver, hands off steering wheel, syncope, closed eyes, eyes rolling back, or the like. Further, the motion detection unit 31 detects, as the motion that is an abnormal sign of the driver, a motion indicating pain when the driver feels pain in his/her body. Specifically, the motion detection unit 31 detects, as the motion indicating pain, a motion of holding the chest, a motion of holding the head, a motion of holding the back, a motion of holding a shoulder, a motion of holding the neck, and an expression of pain. In the motion detection process, abnormal signs of a heart disease, a brain disease, and an arterial disease can be detected by detecting a motion indicating pain of the driver. Thus, according to the abnormality detection device 1, the abnormality detection method, and the abnormality detection program, abnormality of the driver can be early detected with high accuracy.

The motion detection process may be performed by the voice detection unit 34 using a voice analysis method or the like based on the voice information output from the microphone 23. The voice detection unit 34 detects a voice related to a disease of the driver and detects a voice that is an abnormal sign of the driver. For example, the voice detection unit 34 detects a groan and a cry of the driver as the voice that is abnormality of the driver.

Then, the process proceeds to S14 in which a vehicle behavior detection process is performed. The vehicle behavior detection process is a process of detecting behavior of the vehicle, and is performed by the behavior detection unit 32 based on the behavior information acquired by the vehicle behavior information acquisition unit 25. For example, the behavior detection unit 32 detects abnormal behavior of the vehicle due to an abnormal sign of the driver. Specifically, the behavior detection unit 32 detects, as the abnormal behavior of the vehicle, vehicle lane departure, unsteady traveling of the vehicle, operational delay of the vehicle, crossing a stop line, traveling with a risk of a forward collision, and the like.

Then, the process proceeds to S16 in which a biometric information detection process is performed. The biometric information detection process is a process of detecting biometric information on the driver, and is performed by the biometric information detection unit 33. The biometric information detection unit 33 detects biometric information that is an abnormal sign of the driver. For example, the biometric information detection unit 33 detects all or some of an increase in the pulse rate by a predetermined value or more, a decrease in the pulse rate by a predetermined value or less, an increase in the blood pressure by a predetermined value or more, a decrease in the blood pressure by a predetermined value or less, a pulse wave abnormality, arrhythmia, an increase in the respiratory rate by a predetermined number or more, and a decrease in the respiratory rate by a predetermined number or less.

Then, the process proceeds to S18 in which determination as to whether the driver is in an abnormal state is made. This process is performed by the abnormality determination unit 36. The abnormality determination unit 36 determines whether the driver is in an abnormal state based on the detection result of the motion detection unit 31. For example, in a case where the motion detection unit 31 detects a closed eyes state, a syncope state, an eyes rolling back state, or a posture instability state of the driver, the abnormality determination unit 36 determines that the driver has difficulty in driving and is in an abnormal state. On the other hand, in a case where the motion detection unit 31 detects that the driver is not in any of a closed eyes state, a syncope state, an eyes rolling back state, and a posture instability state, the abnormality determination unit 36 determines that the driver is not in an abnormal state. Even in a case where the driver is not in a closed eyes state, a syncope state, an eyes rolling back state, or a posture instability state, the abnormality determination unit 36 can determine that the driver is in an abnormal state when he/she has difficulty in driving.

In a case where it is determined, in S18, that the driver is in an abnormal state, the process proceeds to S22 in which an abnormality determination process is performed. The abnormality determination process is a process of causing the control unit 3 to set or recognize that the driver is in an abnormal state. For example, the abnormality determination unit 36 sets a flag of an abnormal state and causes the control unit 3 to recognize that the driver is in an abnormal state.

On the other hand, in a case where it is determined, in S18, that the driver is not in an abnormal state, the process proceeds to S20 in which determination as to whether the driver shows an abnormal sign is made. This process is performed by the abnormal sign determination unit 35. The abnormal sign determination unit 35 determines whether the driver shows an abnormal sign based on the detection results of the motion detection unit 31, the behavior detection unit 32, the biometric information detection unit 33, and the voice detection unit 34. Specifically, the abnormal sign determination unit 35 determines that the driver shows an abnormal sign in a case where all or some of the motion detection unit 31, the behavior detection unit 32, the biometric information detection unit 33, and the voice detection unit 34 detect that the driver shows an abnormal sign. On the other hand, the abnormal sign determination unit 35 determines that the driver does not show any abnormal sign in a case where all of the motion detection unit 31, the behavior detection unit 32, the biometric information detection unit 33, and the voice detection unit 34 detect that the driver does not show any abnormal sign.

Further, the abnormal sign determination unit 35 may determine that the driver shows an abnormal sign in a case where at least two of the motion detection unit 31, the behavior detection unit 32, the biometric information detection unit 33, and the voice detection unit 34 detect that the driver shows an abnormal sign. In this case, the abnormal sign determination unit 35 determines that the driver does not show any abnormal sign in a case where all of the motion detection unit 31, the behavior detection unit 32, the biometric information detection unit 33, and the voice detection unit 34 detect that the driver does not show any abnormal sign, and, in a case where one of the motion detection unit 31, the behavior detection unit 32, the biometric information detection unit 33, and the voice detection unit 34 detects that the driver shows an abnormal sign.

Further, the abnormal sign determination unit 35 may determine that the driver shows an abnormal sign in a case where one or more of the motion detection unit 31, the biometric information detection unit 33, and the voice detection unit 34 detect that the driver shows an abnormal sign as well as in a case where the behavior detection unit 32 detects that the driver shows an abnormal sign. In this case, the abnormal sign determination unit 35 determines that the driver does not show any abnormal sign in a case where all of the motion detection unit 31, the biometric information detection unit 33, and the voice detection unit 34 detect that the driver does not show any abnormal sign, or, alternatively, in a case where the behavior detection unit 32 detects that the driver does not show any abnormal sign. The abnormal sign determination unit 35 determines that the driver shows an abnormal sign in a case where abnormal behavior of the vehicle is detected as described above. This can reduce erroneous determination as to an abnormal sign of the driver.

Further, after determining whether the driver shows an abnormal sign based on the detection results of the motion detection unit 31, the behavior detection unit 32, the biometric information detection unit 33, and the voice detection unit 34, the abnormal sign determination unit 35 may call the driver whether the driver is able to drive through the speaker 42, and may determine that the driver shows an abnormal sign or the driver is in an abnormal state when there is no response from the driver. In this case, when there is a response from the driver, the abnormal sign determination unit 35 determines that the driver does not show any abnormal sign.

In a case where it is determined that the driver does not show any abnormal sign in S20, the series of control processing in FIG. 2 is finished. On the other hand, in a case where it is determined that the driver shows an abnormal sign in S20, the process proceeds to the abnormality determination process in S22. In this case, by setting or recognizing the abnormal state at a stage of an abnormal sign showing that the driver is not in an abnormal state but is likely to become in an abnormal state, a response equivalent to that for the abnormal state can be taken. Therefore, the abnormality detection device 1 can ensure the safety of vehicle travel.

Then, the process proceeds to S24 in which a vehicle control process is performed. The vehicle control process is performed by the vehicle control unit 38. The vehicle control unit 38 outputs a control signal to the vehicle control unit 41 to run safely the vehicle or stop the vehicle. For example, the vehicle control unit 38 causes the vehicle to automatically run to a position where the vehicle can safely stop, and stops the vehicle after the stop position is determined. In addition, in a case where the destination is set by a navigation system or the like, the vehicle control unit 38 may cause the vehicle to automatically run toward the destination as much as possible. Further, the vehicle control unit 38 may automatically notify emergency service or the like after the vehicle stops. In this case, the biometric information and the image information detected by the abnormality detection device 1 are shared with an emergency facility under the prior agreement with the driver, which can save the life promptly. When the vehicle control process of S24 ends, the series of control processing in FIG. 2 is finished.

As described above, the abnormality detection device 1, the abnormality detection method, and the abnormality detection program according to the present embodiment can accurately detect a sign of the occurrence of abnormality of the driver and can early detect the abnormality of the driver with high accuracy by detecting the abnormal sign and making the abnormal sign determination based on the motion information and the biometric information on the driver, and the abnormal behavior of the vehicle.

The abnormality detection device 1, the abnormality detection method, and the abnormality detection program according to the present embodiment determine that the driver shows an abnormal sign in the body in a case where one or more of the motion detection unit 31 and the biometric information detection unit 33 detect an abnormal sign of the driver as well as in a case where the behavior detection unit 32 detects an abnormal sign of the driver. As a result, the abnormality detection device 1, the abnormality detection method, and the abnormality detection program according to the present embodiment can reduce erroneous detection of an abnormal sign of the driver, and can early detect abnormality of the driver with high accuracy.

In addition, the abnormality detection device 1, the abnormality detection method, and the abnormality detection program according to the present embodiment can accurately detect a sign of the occurrence of abnormality based on a disease of the driver by detecting a motion indicating pain of the driver when pain associated with a disease of the driver occurs. Therefore, the abnormality detection device 1, the abnormality detection method, and the abnormality detection program according to the present embodiment, it is possible to early detect abnormality of the driver with high accuracy.

For example, as illustrated in FIG. 3, angina pectoris which is a heart disease is taken as an example. In a case where the driver develops angina pectoris, plaques (lipids) are generated in the coronary artery, and the coronary artery narrows. At this time, the driver is hard to breathe and feels discomfort in the chest and shoulders. Therefore, the driver frequently touches the chest and shoulders, the respiratory rate of the driver increases, and the driver is in a state of abnormal sign. This delays the operation of the vehicle, and the vehicle's speed increases or decreases. Then, narrowing of the coronary arteries reduces blood flow. At this time, the driver experiences squeezing pain in the shoulders, chest, neck, and the like, which causes palpitations or vertigo. Therefore, the driver makes a motion indicating pain of holding the chest, shoulders, and neck. In addition, the heart rate and the blood pressure of the driver increase due to the pain. In other words, the state of abnormal sign of the driver is continued. As a result, unsteady traveling of the vehicle and an operation delay of the vehicle occur, and a collision risk, crossing a stop line, and the like occur. Then, the supply of blood (oxygen) to the heart becomes insufficient, which slows down the movements of the driver. The driver is therefore in a state of loss of consciousness or syncope. As a result, the driver experiences posture instability (supine, prone, or lateral fall), experiences difficulty in driving, and is in an abnormal state. As described above, the abnormality detection device 1, the abnormality detection method, and the abnormality detection program according to the present embodiment can detect the abnormal state of the driver at the stage of the abnormal sign before the driver experiences difficulty in driving by detecting the motion indicating pain of the driver, the biometric information that is an abnormal sign, and the behavior abnormality of the vehicle when the pain associated with the disease of the driver occurs. Therefore, the abnormality detection device 1, the abnormality detection method, and the abnormality detection program of the present embodiment, it is possible to early detect abnormality of the driver.

In addition, the abnormality detection device 1, the abnormality detection method, and the abnormality detection program according to the present embodiment can accurately detect an abnormal sign associated with a disease by detecting, as the motion indicating pain of the driver, a motion of holding the chest, a motion of holding the head, and a motion of holding the back.

Note that the abnormality detection device, the abnormality detection method, and the abnormality detection program according to the present invention are not limited to the above-described embodiments, and various modifications can be made within the scope described in the claims. The abnormality detection device 1, the abnormality detection method, and the abnormality detection program according to the present embodiment may be configured by appropriately combining the constituent elements of the embodiment and the modifications described above.

According to the abnormality detection device, the abnormality detection method, and the abnormality detection program of the present embodiment, it is possible to early detect abnormality of a driver with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An abnormality detection device comprising:
an input unit that inputs motion information and biometric information on a driver of a vehicle, and behavior information on the vehicle, the behavior information on the vehicle includes information from at least one of a vehicle speed sensor, a steering angle sensor, a camera, or a radar;
a detection unit that detects an abnormal sign of the driver based on the motion information, the biometric information, and the behavior information; and
an abnormal sign determination unit that determines whether the driver shows an abnormal sign in a body based on a detection result of the detection unit, wherein
a motion acquisition unit that acquires the motion information, and
the detection unit includes a motion detection unit that detects a motion indicating pain associated with a disease of the body of the driver based on the motion information acquired by the motion acquisition unit.

2. The abnormality detection device according to claim 1, wherein
the input unit includes a behavior acquisition unit that acquires the behavior information on the vehicle, and a biometric information acquisition unit that acquires the biometric information on the driver,
the detection unit includes a behavior detection unit that detects abnormal behavior of the vehicle based on the behavior information acquired by the behavior acquisition unit, and a biometric information detection unit that detects the biometric information that is the abnormal sign of the driver based on the biometric information acquired by the biometric information acquisition unit, and
the abnormal sign determination unit determines that the driver shows an abnormal sign in the body in a case where one or more of the motion detection unit and the biometric information detection unit detect the abnormal sign of the driver in combination with a case where the behavior detection unit detects the abnormal sign of the driver based on the abnormal behavior of the vehicle.

3. The abnormality detection device according to claim 2, wherein
the motion acquisition unit is a camera that captures an image of the driver, and
the motion detection unit is configured to detect at least the motion indicating pain of the driver in a case where a disease of the driver causes pain.

4. The abnormality detection device according to claim 3, wherein
the motion detection unit is configured to detect, as the motion indicating pain, at least a motion of holding a chest, a motion of holding a head, and a motion of holding a neck.

5. The abnormality detection device according to claim 2, wherein
the biometric information detection unit is configured to detect, as the biometric information generated by pain, at least an increase in the pulse rate by a predetermined value or more, an increase in the blood pressure by a predetermined value or more, and an increase in the respiratory rate by a predetermined number or more.

6. An abnormality detection method comprising:
an input process of inputting motion information and biometric information on a driver of a vehicle, and behavior information on the vehicle, the behavior information on the vehicle includes information from at least one of a vehicle speed sensor, a steering angle sensor, a camera, or a radar;
a detection process of detecting an abnormal sign of the driver based on the motion information, the biometric information, and the behavior information; and
an abnormal sign determination process of determining whether the driver shows an abnormal sign in a body based on a detection result in the detection process, wherein
the detection process includes a motion detection process that detects a motion indicating pain associated with a disease of the body of the driver based on the motion information acquired by the input process.

7. A non-transitory computer-readable storage medium storing an abnormality detection program that causes a computer to detect abnormality of a driver of a vehicle, the abnormality detection program causing the computer to execute processing comprising:
an input process of inputting motion information and biometric information on a driver of a vehicle, and behavior information on the vehicle, the behavior information on the vehicle includes information from at least one of a vehicle speed sensor, a steering angle sensor, a camera, or a radar;
a detection process of detecting an abnormal sign of the driver based on the motion information, the biometric information, and the behavior information; and an abnormal sign determination process of determining whether the driver shows an abnormal sign in a body based on a detection result in the detection process, wherein the detection process includes a motion detection process that detects a motion indicating pain associated with a disease of the body of the driver based on the motion information acquired by the input process.

\* \* \* \* \*